United States Patent [19]

Johnson

[11] 4,081,705
[45] Mar. 28, 1978

[54] MEANS LIMITING END PLAY OF A ROTOR OF A SYNCHRONOUS MOTOR

[75] Inventor: Ronald M. Johnson, Indianapolis, Ind.

[73] Assignee: P. R. Mallory & Co. Inc., Indianapolis, Ind.

[21] Appl. No.: 661,493

[22] Filed: Feb. 26, 1976

[51] Int. Cl.² .............................................. H02K 5/16
[52] U.S. Cl. ...................................... 310/90; 310/162
[58] Field of Search .......................... 310/41, 162–165, 310/90, 156, 209, 191

[56] References Cited
U.S. PATENT DOCUMENTS

| | | | |
|---|---|---|---|
| 3,307,056 | 2/1967 | Woolley | 310/164 X |
| 3,441,325 | 4/1969 | Sjotun | 310/90 X |
| 3,513,339 | 5/1970 | Harris et al. | 310/90 |
| 3,763,386 | 10/1973 | Anderson, Jr. | 310/90 |

Primary Examiner—Donovan F. Doggan
Attorney, Agent, or Firm—Hoffmann, Meyer & Coles

[57] ABSTRACT

An 'O' ring carried on a shaft about which a permanent magnet rotor rotates limits an axial displacement of the rotor in at least one direction.

3 Claims, 3 Drawing Figures

MEANS LIMITING END PLAY OF A ROTOR OF A SYNCHRONOUS MOTOR

Generally speaking, the present invention relates to an improvement in a synchronous motor wherein a permanent magnet rotor rotates about a shaft in response to flux generated between stator poles carried by the permanent magnet rotor, the improvement comprising a stop means carried by the shaft limiting axial displacement of the permanent magnet rotor in at least one direction as it rotates about the shaft.

The present invention relates to synchronous motors and more particularly to the rotor of synchronous motors.

There are a multitude of applications for small synchronous motors of the type having a permanent magnet rotor. Many of these applications are in timing devices such as clocks and in automatic washers, dryers, ranges, and ovens which utilize time sequence switches. Such synchronous motors, for the most part, utilizes a permanent magnet rotor which rotates about a shaft in response to flux generated between stator poles and rotor poles carried by the permanent magnet rotors.

One of the problems associated with motors such as these is that of "end play" in the rotor. More particularly, primarily because of the flux generated between the stator and rotor poles, the rotor axially moves along the shaft about which the rotor rotates. Such movement causes vibration and acoustical noise in the motor.

Another problem associated with such motors is insuring that the rotor is adequately lubricated for ease of rotation about the shaft.

It is, therefore, a feature of the present invention to provide a synchronous motor having a means to limit end play of the permanent magnet rotor of the motor. Another feature of the invention is to provide such a motor wherein the end play of the rotor is limited by a stop means carried by the shaft about which the rotor rotates. Still another object of the invention is the provision of such a motor wherein the stop means includes an 'O' ring carried by the shaft adjacent the rotor. Yet another feature of the invention is the provision of such a motor wherein the 'O' ring is carried by the shaft between a retaining ring and the rotor. Another feature of the invention is to provide such a motor wherein a means is provided to better lubricate the rotor. Yet still another feature of the invention is to provide such a motor wherein the rotor includes a reservoir receiving lubricating fluid.

These and other features of the invention will become apparent from the following description taken in conjunction with the accompanying drawings wherein.

Figure 1:
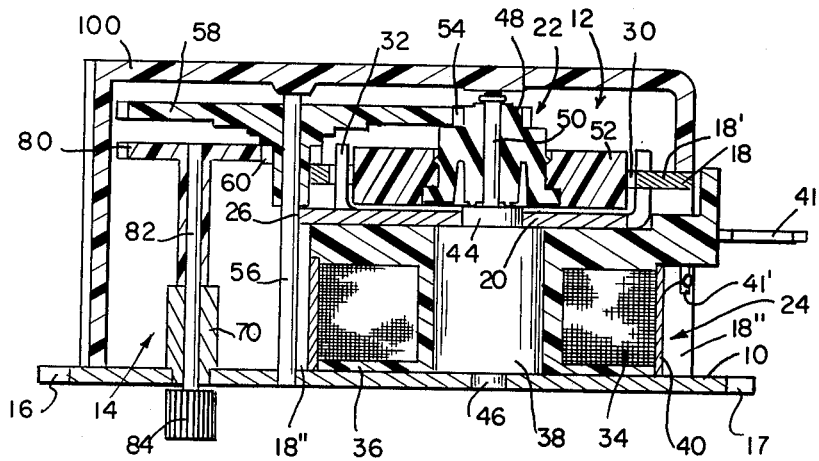
FIG. 1 is a section of a synchronous motor employing the principles of the invention.

Referring now to the drawings, mounting plate 10 provides a base upon which a motor section 12 and speed reducing section 14 may be carried. The mounting plate 10 is substantially rectangular in shape and includes a pair of ears 16 and 17 which may be used to mount the motor to a panel.

Motor section 12 is generally of the synchronous motor type and includes an outer field plate 18, inner field plate 20, rotor assembly 22, and an energizing winding 24.

The outer field plate 18 is substantially U-shaped with a flat bottom portion 18' and a pair of opposed upstanding legs 18" extending therefrom. The distal ends of the upstanding legs engage mounting plate 10 to provide an enclosure extending linearly to an area near the center of the mounting plate. There is an aperture provided in the flat-bottom portion 18' into which a plurality of poles 30 extend more or less generally in a circular fashion. A suitable material for the field plate would include, for example, ordinary cold rolled steel, preferably annealed.

The inner field plate 20 includes a substantially flat plate having integral poles 32 formed therefrom by lancing radial strips out of the plate. The poles are bent upwards to be intermeshed with the poles 30 of the outer field plate. The inner field plate may be fabricated from cold-rolled steel, preferably annealed.

Energizing winding 24 includes a bobbin 36 surrounding an iron core 38 and a coil 34 of a predetermined number of turns of wire carried by the bobbin. The coil is electrically insulated and protected by a cover 40 of a suitable fabric. Iron core 38 includes a hub portion 44 which carries the inner field plate 20 and stud 46 which serves to locate the core to the mounting plate 10. A plurality of electrical terminals 41 are carried by bobbin 36 and include tabs 41' around which wires of the coil may be wound.

Speed reduction section 14 includes at least one shaft 56 extending from the mounting plate 10 juxtaposition the enclosure provided by the outer field plate 18 and mounting plate 10. Shaft 56 is primarily supported solely by the mounting plate 10, and is further supported by being welded to the inner field plate at 26. At least one speed reduction gear 58 is rotatably journalled to and carried by the shaft 56. Gear 58 meshes with pinion 54 carried by rotor 48 of the rotor assembly 22. Gear 58 includes a pinion 60 which meshes with gear 80 which is fixedly carried on shaft 82. Shaft 82 rotates within bushing 70 and carries an output pinion 84. As is well known, output pinion 84 may mesh with a device to be driven by the motor. Although only a two stage reduction has been shown for illustrative purposes, it should be understood additional stages can be used in a manner well known in the art.

A shroud 100 covers substantially the entire motor and speed reduction sections to aid in keeping dust and other deleterious matter from the structures. In addition the shroud aids in keeping the gears and other mechanism within a confined area.

In general, rotor assembly 22 includes a rotor 48 which is rotatably carried on shaft 50 and permanent magnet ring 52 carried by the rotor. Shaft 50 is rigidly held in iron core 38. The permanent magnet 52 may be fabricated of a material such as a barium ferrite-nylon magnet with its outer periphery being impressed or magnetized into separate pole segments 53 of alternate sets of poles of north and south polarity. As shown, the rotor assembly is disposed within the intermeshed poles of the inner and outer field plates and rotatable therein.

Rotor 48 is circular in cross section and fabricated from a suitable elastomeric material. A suitable elastomeric material has been found to consist essentially of about 90% by weight a urethane elastomer, the remainer being graphite. Such a material is marketed by Liquid Nitrogen Processing Corp. of Malvern, Pa. and identified as E 382 LNP. Such material, while being strong enough to handle the loads, also is soft enough to premit ring magnet 52 to be carried by the rotor through an interference or snap fit.

Figure 2:
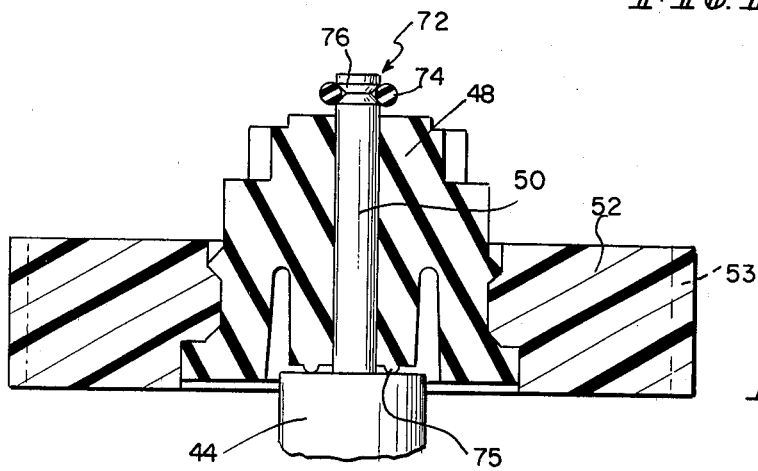
FIG. 2 is an enlarged section of the permanent magnet rotor of the synchronous motor of FIG. 1.

In operation, when an AC current is applied to the winding 24, rotor 48 will begin to rotate due to the magnetic flux generated between poles of the permanent magnet and the field poles. A one-way directional system (not shown) will assure operable rotation of the rotor in the right direction. Such directional system may be one of several types, either mechanical or magnetic, as is well known in the art. The speed reduction means will change the rotor output to a desired rotational speed to be applied to motor output pinion 84. As rotor 48 rotates within the field poles a certain amount of "end play" of the rotor occurs. More specifically, rotor 48 will be axially displaced along shaft 50 due primarily to the forces of the flux being generated. Such axial displacement of the rotor causes vibration and noise in the motor. To this end there is provided, as more clearly shown in FIG. 2, a stop means 72 carried by shaft 50. As shown, stop means 72 includes a ring such as an 'O'-ring 74 carried in groove 76 of the shaft. Axial displacement of the rotor is thus limited in one direction by the 'O'-ring, the displacement in the opposite direction being limited by bearing surface 75 abutting against hub 44.

Figure 3:
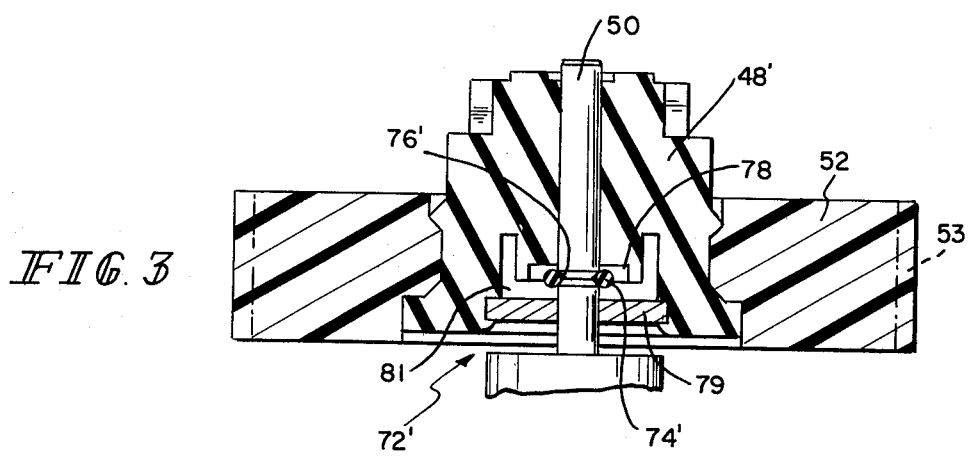
FIG. 3 is a view similar to that of FIG. 2 illustrating another embodiment of the invention.

FIG. 3 illustrates another embodiment of the invention. In this embodiment axial displacement is limited in both direction by stop means 72'. Stop means 72' includes 'O'-ring 74' carried in groove 76' of the shaft 50 and disposed in a recess 78 provided in rotor 48' and retaining ring 79 carried by the rotor. Thus axial displacement of the rotor is limited in one direction by the rotor engaging the 'O' ring and in the opposite direction by the retaining ring engaging the 'O' ring.

A suitable material for the 'O' ring in both embodiments is a fluorocarbon elastomer.

In the embodiment of FIG. 3 there is also provided a reservoir 81 for receiving lubricating fluid to aid in smooth rotor rotation.

What is claimed is:

1. In a synchronous motor wherein a permanent magnet rotor rotates about a fixed shaft in response to flux generated between stator poles and rotor poles carried by said permanent magnet rotor, the improvement comprising:
   (a) a recess in said rotor surrounding said shaft,
   (b) a first ring carried by said rotor and surrounding said shaft to close an open end of said recess and provide a resevoir in said rotor for receiving a lubricating fluid, and
   (c) a second ring carried by said shaft in said resevoir, whereby upon axial displacement of said rotor along said shaft, said first and second rings engage each other to limit said axial displacement.

2. In a synchronous motor according to claim 1 wherein said ring is an 'O' ring.

3. In a synchronous motor according to claim 2, wherein said 'O' ring is carried in a groove provided in said shaft.

* * * * *